(12) United States Patent
Rogoza et al.

(10) Patent No.: US 11,857,869 B2
(45) Date of Patent: Jan. 2, 2024

(54) HANDHELD CONTROLLER WITH HAND DETECTION SENSORS

(71) Applicant: META PLATFORMS TECHNOLOGIES, LLC, Menlo Park, CA (US)

(72) Inventors: Benjamin Elliott Tunberg Rogoza, Seattle, WA (US); Sharvil Shailesh Talati, Seattle, WA (US); James Stocker Webb, Seattle, WA (US); Yi-yaun Chen, Seattle, WA (US); Jason Andrew Higgins, Seattle, WA (US); Bradley Morris Johnson, Edmonds, WA (US); Peter Wesley Bristol, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 714 days.

(21) Appl. No.: 15/172,099

(22) Filed: Jun. 2, 2016

(65) Prior Publication Data
US 2017/0189798 A1 Jul. 6, 2017

Related U.S. Application Data

(60) Provisional application No. 62/273,727, filed on Dec. 31, 2015.

(51) Int. Cl.
| | |
|---|---|
| *A63F 13/24* | (2014.01) |
| *G06F 3/0338* | (2013.01) |
| *G06F 3/02* | (2006.01) |
| *G06F 3/0354* | (2013.01) |
| *G06F 3/01* | (2006.01) |
| *G06F 3/0346* | (2013.01) |

(52) U.S. Cl.
CPC .............. *A63F 13/24* (2014.09); *G06F 3/011* (2013.01); *G06F 3/014* (2013.01); *G06F 3/02* (2013.01); *G06F 3/0338* (2013.01); *G06F 3/0346* (2013.01); *G06F 3/03547* (2013.01)

(58) Field of Classification Search
CPC .......... A63F 13/24; G06F 3/011; G06F 3/014; G06F 3/02
USPC .......................................................... 463/37
See application file for complete search history.

(56) References Cited

U.S. PATENT DOCUMENTS

| | | |
|---|---|---|
| 4,518,164 A | 5/1985 | Hayford, Jr. et al. |
| 4,552,360 A | 11/1985 | Schenck et al. |
| (Continued) | | |

OTHER PUBLICATIONS

Final Office Action dated Aug. 18, 2017 for U.S. Appl. No. 14/939,470 by Long, C., et al., filed Nov. 12, 2015.

(Continued)

*Primary Examiner* — Kevin Y Kim
(74) *Attorney, Agent, or Firm* — Greenberg Traurig, LLP

(57) ABSTRACT

A handheld controller configured to be held by a user's hand. The handheld controller comprising a main body, and a handle extending from the main body, wherein the handle has a palm side and a finger side. A control button is positioned on the main body or handle, and a detection sensor is on the handle. The detection sensor is positioned to detect the presence of the finger or palm of a user's hand engaging the handle. The detection sensor can be a capacitive touch sensor, a proximity sensor or other detection sensor operative to detect the touch or spatial presence of the user's hand or fingers.

20 Claims, 7 Drawing Sheets

(56) References Cited

U.S. PATENT DOCUMENTS

| | | |
|---|---|---|
| 5,087,825 A | 2/1992 | Ingraham et al. |
| 5,181,009 A | 1/1993 | Perona |
| 5,207,426 A | 5/1993 | Inoue et al. |
| D341,094 S | 11/1993 | Austin |
| 5,265,009 A | 11/1993 | Colavita et al. |
| D350,351 S | 9/1994 | Nakamura |
| 5,421,590 A | 6/1995 | Robbins et al. |
| D363,320 S | 10/1995 | Barthelemy et al. |
| 5,479,163 A | 12/1995 | Samulewicz |
| D369,754 S | 5/1996 | Donaldson |
| 5,551,701 A | 9/1996 | Bouton et al. |
| 5,616,078 A | 4/1997 | Oh et al. |
| 5,645,277 A | 7/1997 | Cheng |
| 5,764,164 A * | 6/1998 | Cartabiano ............ G06F 3/014 400/100 |
| 5,796,354 A | 8/1998 | Cartabiano et al. |
| 5,982,355 A | 11/1999 | Jaeger et al. |
| D418,174 S | 12/1999 | Jankowski |
| D418,879 S | 1/2000 | Hornsby et al. |
| 6,173,203 B1 | 1/2001 | Barkley et al. |
| 6,192,253 B1 | 2/2001 | Charlier et al. |
| 6,198,471 B1 * | 3/2001 | Cook ..................... G05G 9/047 345/156 |
| 6,430,110 B2 | 8/2002 | Baroche et al. |
| D472,972 S | 4/2003 | Anderson et al. |
| 6,544,124 B2 | 4/2003 | Woodward et al. |
| 6,572,108 B1 | 6/2003 | Bristow |
| 6,590,835 B2 | 7/2003 | Farine et al. |
| 6,652,383 B1 | 11/2003 | Sonoda et al. |
| 6,970,157 B2 | 11/2005 | Siddeeq et al. |
| 7,004,469 B2 | 2/2006 | von Goeben et al. |
| 7,106,197 B2 | 9/2006 | Gaiotto et al. |
| 7,331,793 B2 | 2/2008 | Hernandez et al. |
| 7,345,670 B2 | 3/2008 | Armstrong et al. |
| D586,823 S | 2/2009 | Anderson et al. |
| D616,417 S | 5/2010 | Liao et al. |
| 8,064,972 B2 | 11/2011 | Russo et al. |
| D656,996 S | 4/2012 | Mikhailov et al. |
| 8,188,842 B2 | 5/2012 | Otsuka et al. |
| 8,267,786 B2 | 9/2012 | Ikeda |
| 8,439,753 B2 | 5/2013 | Nagata et al. |
| 8,795,078 B1 | 8/2014 | Musick, Jr. et al. |
| 8,882,596 B2 | 11/2014 | Takahashi et al. |
| 8,994,643 B2 | 3/2015 | Goodwin et al. |
| D729,803 S | 5/2015 | Avery et al. |
| 9,141,087 B2 | 9/2015 | Brown et al. |
| 9,386,662 B1 | 7/2016 | Krueger et al. |
| 9,421,472 B2 | 8/2016 | Buller et al. |
| D772,986 S | 11/2016 | Bristol et al. |
| D780,807 S | 3/2017 | Bristol et al. |
| 9,678,566 B2 | 6/2017 | Webb et al. |
| D795,959 S | 8/2017 | Hubler et al. |
| D800,841 S | 10/2017 | Hubler et al. |
| 9,804,693 B2 | 10/2017 | Long |
| D802,055 S | 11/2017 | Chen et al. |
| 9,839,840 B2 | 12/2017 | Long et al. |
| 2001/0015718 A1 | 8/2001 | Hinckley et al. |
| 2001/0045938 A1 | 11/2001 | Willner et al. |
| 2002/0072415 A1 | 6/2002 | Kikukawa et al. |
| 2002/0082079 A1 * | 6/2002 | Mantyjarvi ............ A63F 13/10 463/30 |
| 2002/0169023 A1 * | 11/2002 | Tanaka ................... A63F 13/24 463/36 |
| 2003/0100367 A1 | 5/2003 | Cooke et al. |
| 2004/0222963 A1 | 11/2004 | Guo et al. |
| 2004/0222970 A1 | 11/2004 | Martinez et al. |
| 2005/0248544 A1 | 11/2005 | Adam et al. |
| 2005/0255915 A1 | 11/2005 | Riggs et al. |
| 2006/0258458 A1 * | 11/2006 | Addington ............ A63F 13/02 463/36 |
| 2006/0287089 A1 | 12/2006 | Addington et al. |
| 2007/0049374 A1 | 3/2007 | Ikeda et al. |
| 2007/0066394 A1 | 3/2007 | Ikeda et al. |
| 2007/0084293 A1 | 4/2007 | Kaiserman et al. |
| 2007/0293318 A1 | 12/2007 | Tetterington et al. |
| 2008/0204462 A1 * | 8/2008 | Reed ................. G01C 21/3614 345/520 |
| 2008/0220865 A1 * | 9/2008 | Hsu ....................... A63F 13/08 463/37 |
| 2008/0261693 A1 | 10/2008 | Zalewski et al. |
| 2008/0261695 A1 | 10/2008 | Coe et al. |
| 2009/0005164 A1 | 1/2009 | Chang et al. |
| 2009/0143110 A1 | 6/2009 | Armstrong et al. |
| 2009/0149256 A1 | 6/2009 | Lui et al. |
| 2009/0290345 A1 | 11/2009 | Shaner et al. |
| 2009/0295721 A1 | 12/2009 | Yamamoto et al. |
| 2009/0298590 A1 | 12/2009 | Marks et al. |
| 2010/0009760 A1 | 1/2010 | Shimamura et al. |
| 2010/0085321 A1 | 4/2010 | Pundsack et al. |
| 2010/0118195 A1 | 5/2010 | Eom et al. |
| 2010/0144436 A1 | 6/2010 | Marks et al. |
| 2010/0184513 A1 | 7/2010 | Mukasa et al. |
| 2011/0214499 A1 * | 9/2011 | Hodge ..................... F41A 33/00 73/167 |
| 2011/0294579 A1 | 12/2011 | Marks et al. |
| 2012/0040757 A1 * | 2/2012 | Page ....................... H04R 5/02 463/35 |
| 2012/0088582 A1 | 4/2012 | Wu et al. |
| 2012/0202597 A1 | 8/2012 | Yee et al. |
| 2012/0261551 A1 | 10/2012 | Rogers et al. |
| 2012/0302347 A1 * | 11/2012 | Nicholson ............... A63F 13/24 463/37 |
| 2013/0162450 A1 | 6/2013 | Leong et al. |
| 2013/0324254 A1 | 12/2013 | Huang et al. |
| 2014/0015813 A1 | 1/2014 | Numaguchi et al. |
| 2014/0018166 A1 * | 1/2014 | Guild ..................... A63F 13/02 463/31 |
| 2014/0141891 A1 | 5/2014 | Georgy et al. |
| 2014/0203953 A1 | 7/2014 | Moser et al. |
| 2014/0228124 A1 | 8/2014 | Plagge et al. |
| 2014/0273546 A1 | 9/2014 | Harmon et al. |
| 2014/0361977 A1 | 12/2014 | Mao et al. |
| 2014/0362110 A1 | 12/2014 | Stafford |
| 2014/0364212 A1 | 12/2014 | Osman et al. |
| 2014/0378227 A1 | 12/2014 | Lee |
| 2015/0077398 A1 | 3/2015 | Yairi et al. |
| 2015/0094142 A1 | 4/2015 | Stafford |
| 2015/0155445 A1 | 6/2015 | Crowder et al. |
| 2015/0234192 A1 * | 8/2015 | Lyons ................... G02B 27/022 345/8 |
| 2015/0234477 A1 | 8/2015 | Watson et al. |
| 2015/0253574 A1 | 9/2015 | Thurber |
| 2015/0258431 A1 | 9/2015 | Strafford et al. |
| 2015/0258432 A1 | 9/2015 | Tokubo et al. |
| 2015/0268920 A1 | 9/2015 | Schapiro |
| 2015/0370320 A1 | 12/2015 | Connor et al. |
| 2016/0026268 A1 * | 1/2016 | Chassot ................ G06F 3/03543 345/158 |
| 2016/0100471 A1 * | 4/2016 | Van De Sluis ........ H05B 47/19 315/293 |
| 2016/0351362 A1 | 12/2016 | Gassoway et al. |
| 2016/0357249 A1 | 12/2016 | Webb et al. |
| 2016/0357261 A1 | 12/2016 | Webb et al. |
| 2016/0361637 A1 | 12/2016 | Bristol et al. |
| 2016/0361638 A1 | 12/2016 | Rogoza et al. |
| 2016/0363996 A1 | 12/2016 | Rogoza et al. |
| 2016/0364910 A1 | 12/2016 | Katz et al. |
| 2017/0128828 A1 | 5/2017 | Long |
| 2017/0131767 A1 | 5/2017 | Long |
| 2017/0136351 A1 | 5/2017 | Long |
| 2017/0139481 A1 | 5/2017 | Long et al. |
| 2017/0168303 A1 | 6/2017 | Petrov et al. |
| 2017/0177102 A1 | 6/2017 | Long et al. |
| 2017/0189799 A1 | 7/2017 | Anderson et al. |
| 2017/0189802 A1 | 7/2017 | Rogoza et al. |
| 2017/0192495 A1 | 7/2017 | Drinkwater et al. |
| 2017/0192506 A1 | 7/2017 | Andersen et al. |

OTHER PUBLICATIONS

Non-Final Office Action dated Aug. 24, 2017 for U.S. Appl. No. 14/991,875 by Drinkwater, J., et al., filed Jan. 8, 2016.

(56) References Cited

OTHER PUBLICATIONS

Notice of Allowance dated Sep. 15, 2017 for U.S. Appl. No. 14/975,049 by Long, C. et al., filed Dec. 15, 2015.
U.S. Appl. No. 29/611,924 by Chen, Y., et al., filed Jul. 26, 2017.
Advisory Action dated Dec. 27, 2017 for U.S. Appl. No. 14/939,470 by Long, C., et al., filed Nov. 12, 2015.
Notice of Allowance dated Dec. 22, 2017 for U.S. Appl. No. 14/991,875 by Drinkwater, J., et al., filed Jan. 8, 2016.
Supplemental Notice of Allowability dated Jul. 10, 2017 of U.S. Appl. No. 29/571,030 by Chen, Y., et al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
Canadian Examiner's Report in Patent Application No. 163,150, dated Dec. 15, 2015, 5 pages.
Canadian Examiner's Report in Patent Application No. 163,150, dated Apr. 8, 2016, 7 pages.
Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.
First Examination Report in Indian Patent Application No. 278273, dated Mar. 18, 2016, 2 pages.
Office Action in Korean Patent Application No. 30-2015-0063452, dated Aug. 9, 2016, 3 pages.
Office Action in Mexican Design Patent Application No. MX/f/2015/003769, dated Feb. 7, 2017, 4 pages.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 14/939,431 by Long, C., et al., filed Nov. 12, 2015.
U.S. Appl. No. 14/934,073 by Long, C., et al., filed Nov. 5, 2015.
U.S. Appl. No. 14/939,470 by Long, C., et al., filed Nov. 12, 2015.
U.S. Appl. No. 14/975,049 by Long, C., et al., filed Dec. 18, 2015.
U.S. Appl. No. 14/934,090 by Long, C., et al., filed Nov. 5, 2015.
U.S. Appl. No. 15/173,474 by Rogoza, B., et al., filed Jun. 3, 2016.
U.S. Appl. No. 15/173,558 by Andersen, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Mar. 30, 2017 for U.S. Appl. No. 14/939,470 by Long, C., et al., filed Nov. 12, 2015.
Non-Final Office Action dated Apr. 7, 2017 for U.S. Appl. No. 14/975,049 by Long, C., et al., filed Dec. 18, 2015.
Ex Parte Quayle Action mailed May 5, 2017 for U.S. Appl. No. 29/571,027 by Chen, Y., et al., filed Jul. 13, 2016.
Ex Parte Quayle Action mailed May 5, 2017 for U.S. Appl. No. 29/571,030 by Chen, Y., et al., filed Jul. 13, 2016.
Ex Parte Quayle Action mailed May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Office Action in Brazil Design Patent Application No. 30-2015-005620-7, dated May 30, 2017,30 pages.
"STEM System" accessed and printed from URL <http://sixense.com/wireless>, 5 pages.
Final Office Action dated Nov. 2, 2017 for U.S. Appl. No. 14/934,073 by Long, C., et al., filed Nov. 5, 2015.
Notice of Allowance dated Oct. 20, 2017 for U.S. Appl. No. 14/934,090 by Long, C., et al., filed Nov. 5, 2015.
Restriction Requirement dated Oct. 12, 2017 for U.S. Appl. No. 29/579,091 by Chen, Y., et al., filed Sep. 27, 2016.
Supplemental Notice of Allowability dated Sep. 29, 2017 for U.S. Appl. No. 29/571,027 by Chen, Y., et al., filed Jul. 13, 2016.
Tested, "Hands-On with Sixense STEM VR Motion-Tracking System" accessed and printed from URL <https://www.youtube.com/watch?v=C8z-On6FBTM>, 5 pages.
Non-Final Office Action dated Nov. 1, 2017 for U.S. Appl. No. 15/173,558 by Andersen, B., et al., filed Jun. 3, 2016.

* cited by examiner

HANDHELD CONTROLLER WITH HAND DETECTION SENSORS

CROSS-REFERENCE TO RELATED APPLICATION(S)

This application claims priority to U.S. Provisional Patent Application No. 62/273,727, filed Dec. 31, 2015, entitled "Handheld Controller with Hand Detection Sensors" which is incorporated in its entirety by reference thereto.

TECHNICAL FIELD

This patent application is directed to handheld controllers and, more specifically, to virtual reality handheld controllers.

BACKGROUND

In a virtual reality system, a user wears a head-mounted display that presents a selected virtual reality (VR) environment in front of the user's eyes. In some VR systems, a user can manipulate items in the virtual environment with handheld controllers. The controllers include tracking patterns comprised of a pattern of lights, for example. The system monitors the movement of the tracking patterns with a tracking camera and reproduces the user's hand movements in the virtual environment. However, buttons traditionally used on game controllers, for example, do not typically detect detailed hand movements. For example, individual finger movements and gestures, as well as hand movements relative to the controller, are not captured with traditional button configurations.

BRIEF DESCRIPTION OF THE DRAWINGS

Embodiments of the handheld controller with detection sensors introduced herein may be better understood by referring to the following Detailed Description in conjunction with the accompanying drawings, in which like reference numerals indicate identical or functionally similar elements.

Figure 1:
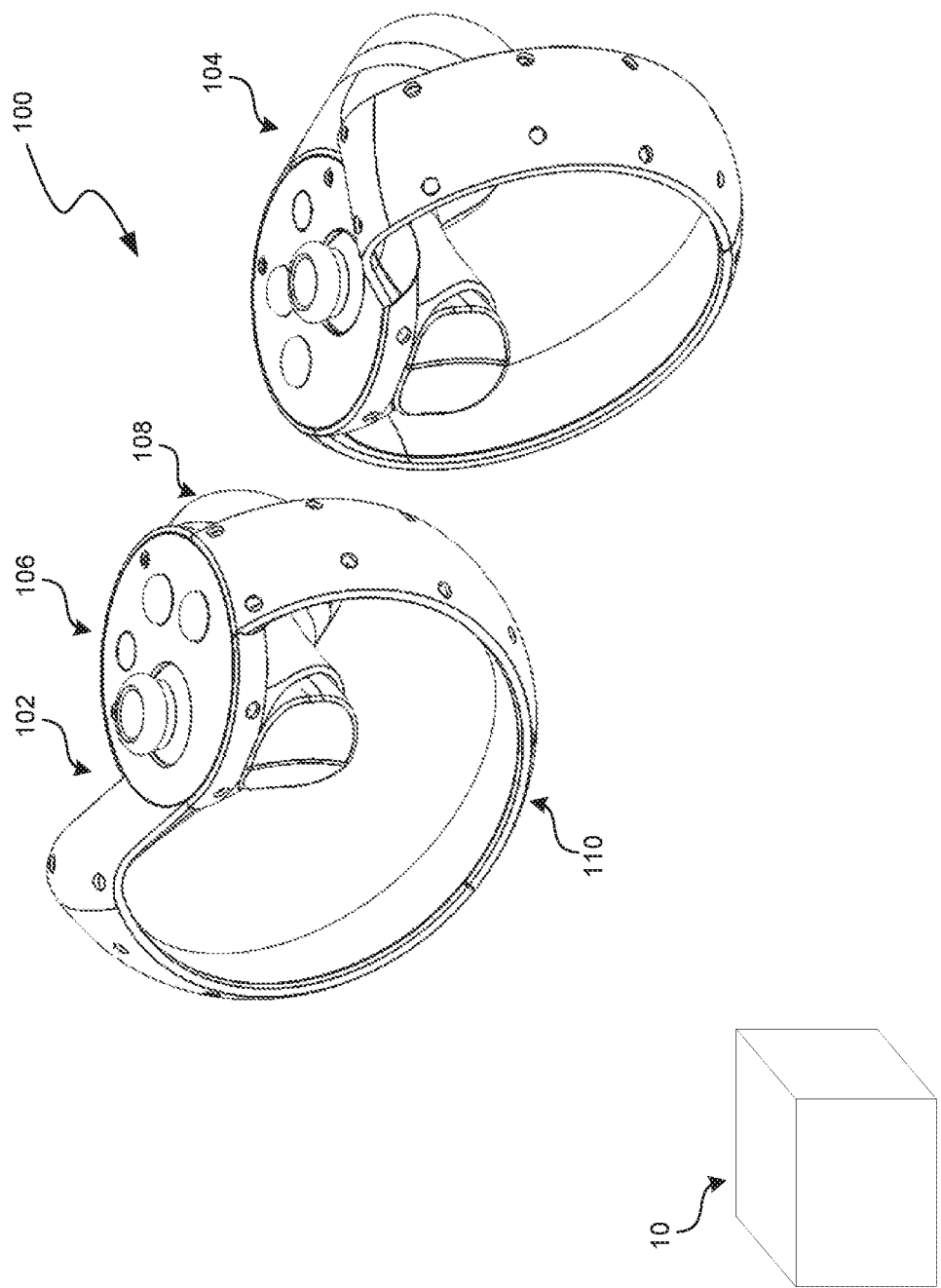
FIG. 1 is an isometric view of a pair of handheld controllers each including hand detection sensors according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A handheld controller with touch or proximity detection sensors is disclosed. In an embodiment, the handheld controller is configured to be held by a user's hand, the controller includes a main body, a handle extending from the main body, and a control button positioned on the main body or the handle. A detection sensor is on the handle and positioned to detect the presence of the finger or palm of a user's hand engaging the handle. The detection sensor can be a pressure sensor, a capacitive touch sensor, or a proximity sensors to detect the touch or spatial location of the user's fingers relative to the handle.

One embodiment provides a handheld controller comprising a main body having a thumb surface, a thumbstick extending from the thumb surface, a surrounding ring portion extending from the main body, and a handle extending from the main body. The handle has a palm side and a finger side. A trigger button is positioned on the main body or handle, and a third-finger button is positioned on the finger side of the handle. A detection sensor is on the handle and positioned to detect the presence of the finger or palm of a user's hand engaging the handle and operative to output a signal corresponding to a presence of the user's hand relative to the handle.

Another embodiment provides a handheld controller comprising a main body, and a handle extending from the main body, wherein the handle has a palm side and a finger side. A trigger button is positioned on the main body or handle. A first detection sensor is on the finger side of the handle and positioned to detect the presence of a first one of the user's fingers relative to the handle. A second detection sensor is on the finger side of the handle adjacent to the first detection sensor and positioned to detect the presence of a second one of the user's fingers relative to the handle. A third detection sensor is on the handle and positioned to detect the presence of a portion of the user's hand relative to the handle.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a pair of handheld controllers 100 according to a representative embodiment. The pair of handheld controllers 100 includes a right-hand controller 102 and a left-hand controller 104. The primary structure of the right-hand controller 102 and the left-hand controller 104 when held adjacent to each other in a similar orientation, as illustrated, are substantially symmetric with respect to each other. Both the controllers 102/104 are described herein with respect to the right-hand controller 102, as both controllers include the same or similar features, albeit in mirror image. The right-hand controller 102 includes a main body 106 and a handle portion 108 extending from the main body 106. In some embodiments, a surrounding ring portion 110 extends from the main body 106. The controllers 102/104 can be part of a VR system 10, such as the Rift™ available from Oculus™.

Figure 2:
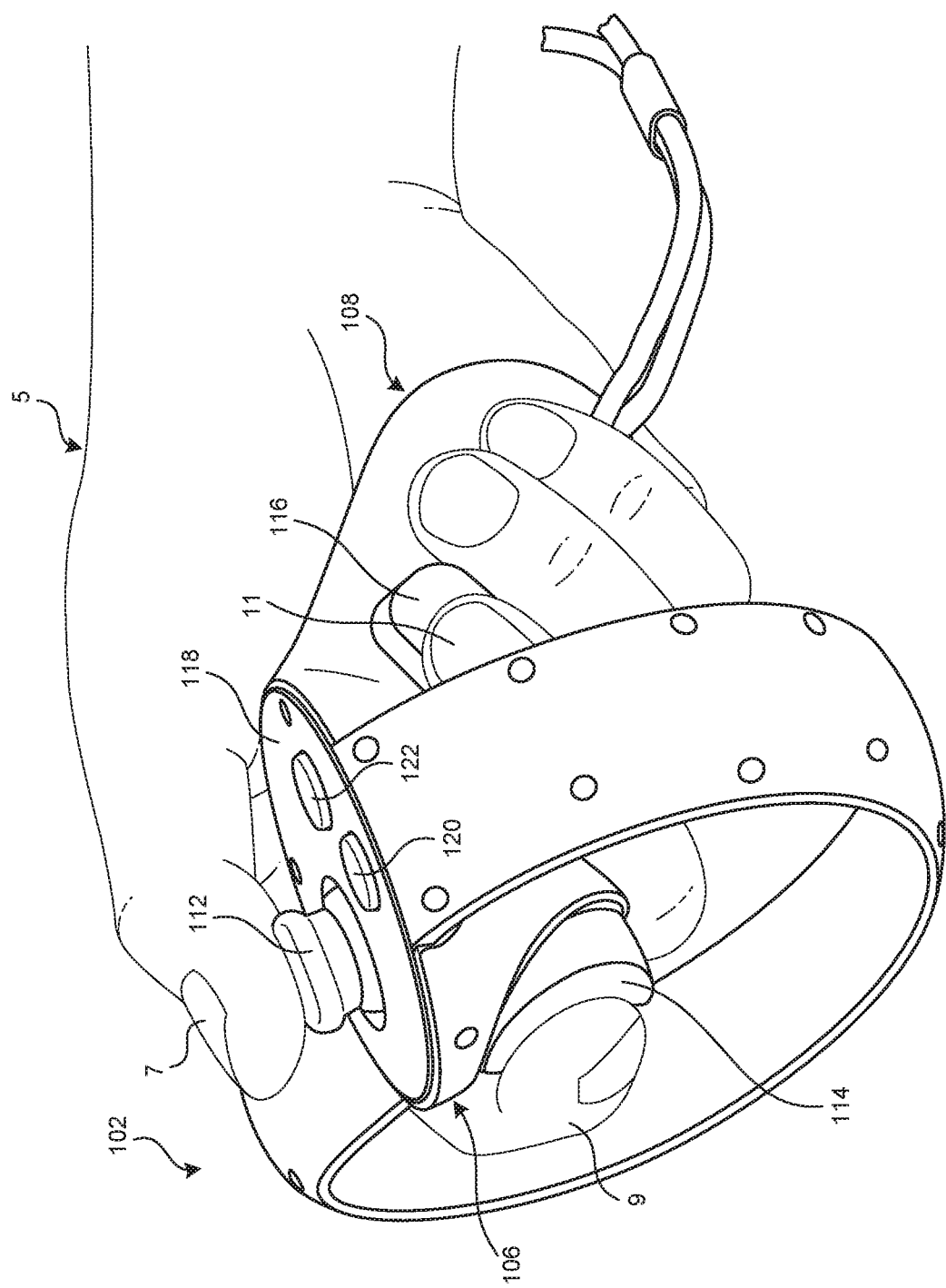
FIG. 2 is an isometric view of a user's right hand grasping the right-hand controller of FIG. 1.

As shown in FIG. 2, the right-hand controller 102 includes a thumbstick 112, a trigger button 114 and a third-finger button 116. The main body 106 includes a thumb surface 118 from which the thumbstick 112 extends. The main body 106 may also include one or more buttons 120 and 122 positioned on the thumb surface 118. In some embodiments, the thumb surface 118 is a substantially planar surface. The handle portion 108 extends from the main body 106 on a side generally opposite the trigger button 114. The main body 106 and the handle portion 108 are ergonomically contoured such that a user's hand 5 can comfortably grasp the handheld controller 102 as illustrated. When the controller 102 is grasped, the user's thumb 7 (i.e., the first finger) is comfortably positionable above the main body 106 with the thumb 7 engaging on the thumbstick 112. The user's second or index finger 9 is positioned on the trigger button 114. The user's third or middle finger 11 operates the third-finger button 116. The third-finger button 116 is operative to detect whether the user is grasping the handle portion 108 with his or her third-finger 11. In some embodiments, the third-finger button 116 can detect various degrees of deflection corresponding to the force or pressure of a user's grip on the handle portion 108.

In some embodiments, the third-finger button 116 is active depending on the context of an associated virtual environment or game. In other embodiments, the third-finger button 116 is activated mechanically or by another sensor. One embodiment could include a palm sensor (e.g., analogous to a pistol grip safety or grip switch), such that when the palm sensor detects the user's hand, and the third-finger button 116 is released, an output signal indicates an "open-hand gesture."

In some embodiments, the handle portion 108 can include one or more detection sensors 125 positioned to detect the presence of the user's palm or a portion of a finger, indicating that the user is holding the handle portion 108, indicating how the user is holding the handle portion, or how the user is moving his or her hand relative to the handle portion. For example, the detection sensor 125 can be a capacitive touch sensor on the handle portion, such as adjacent to the third finger button 116 or in a position for engagement by the user's fourth or fifth finger when grasping the handle. A detection sensor 125 can be positioned to be engaged by a portion of the user's second finger (i.e., index finger) or third finger (i.e., middle finger) that is on the handle portion 108 adjacent to the trigger button 114 or the third-finger button 116, indicating the presence of the user's fingers on the handle portion 108 even if the associated finger has been lifted off of the trigger button 114 or the third finger button 116. Detection sensors 125 can be provided on the handle portions corresponding to the position of all of the user's fingers grasping the handle.

In one embodiment, one or more of the detection sensors 125 are proximity sensors configured to detect the spatial location of the user's fingers or hand relative to the handle portion 108. For example, the proximity sensor 125 could be used to detect the presence of the user's finger and the separation distance between the respective finger and the surfaced of the handle portion 108. The proximity sensors 125 can be configured to allow detection of movement of the user's fingers or other portions of the user's hand relative to the handle portion 108. The detected separation distance and/or movement can be used in connection with signals, commands, or other control signals related to the hand shape or position of the user's hand or fingers relative to the handle portion 108.

In some embodiments, the handle portion 108 can include a combination of pressure sensors, capacitive touch sensors, and/or proximity sensors that provide signals to the VR system 10, for example, to initiate a command or to replicate a hand configuration in a corresponding apparition or avatar.

When the third-finger button 116 is depressed, the system registers that the user's hand is closed or grasped around the handle portion 108. When the third-finger button 116 is not depressed, the system can indicate an open hand gesture. The presence of a gesture can be a signal to the VR system 10 to initiate a command or to include the gesture in a corresponding apparition or avatar. The third-finger button 116 allows a user to maintain a grip on the handle portion 108 while still being able to provide hand grip inputs to the VR system. In another embodiment, the third button on the handle is positioned for engagement by the user's ring or fourth finger or the pinkie or fifth finger, or a combination of the third, fourth and/or fifth fingers. In some embodiments, the thumbstick 112, the trigger button 114, the thumb surface 118, and the buttons 120 and 122 can be configured to detect other hand and finger gestures as explained in U.S. patent application Ser. No. 14/939,470, titled "METHOD AND APPARATUS FOR DETECTING HAND GESTURES WITH A HANDHELD CONTROLLER," filed Nov. 12, 2015, and U.S. patent application Ser. No. 14/975,049, titled HANDHELD CONTROLLER WITH ACTIVATION SENSORS, filed Dec. 18, 2015, all of which are hereby incorporated by reference in their entireties.

Figure 3:
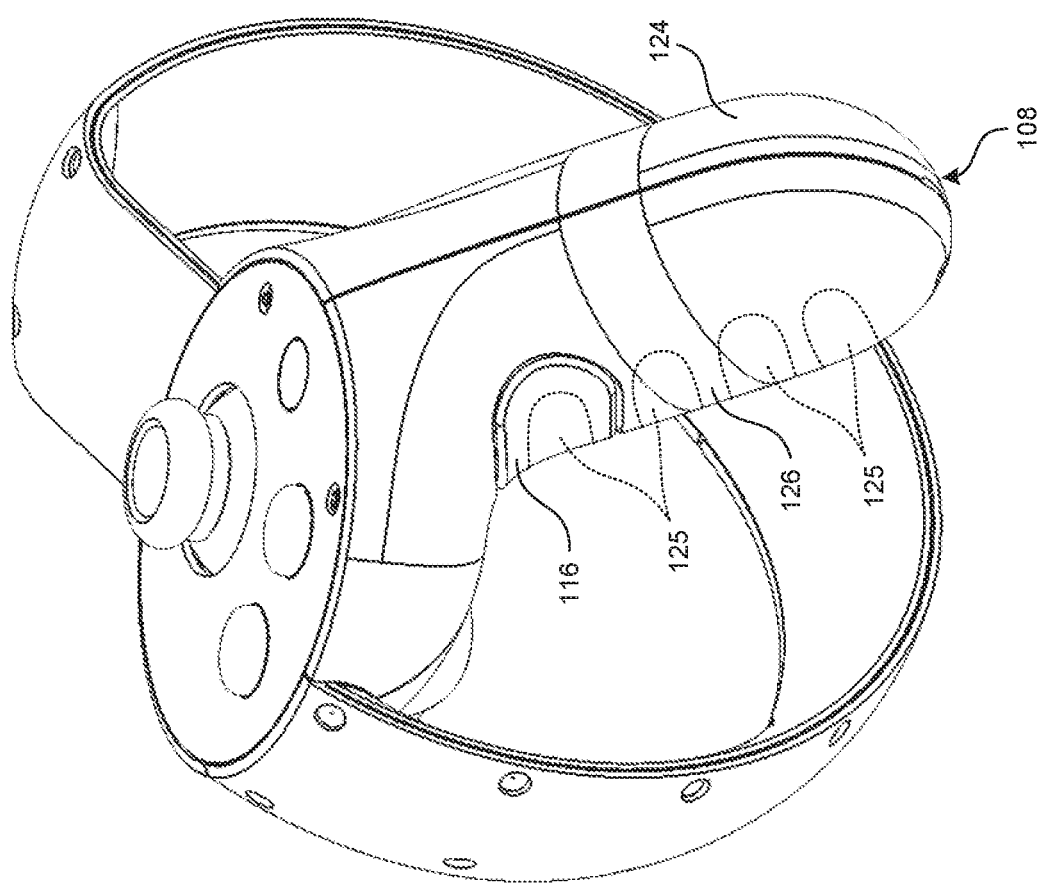
FIG. 3 is an isometric view of the right-hand controller shown in FIGS. 1 and 2 as viewed from the handle.
Figure 4:
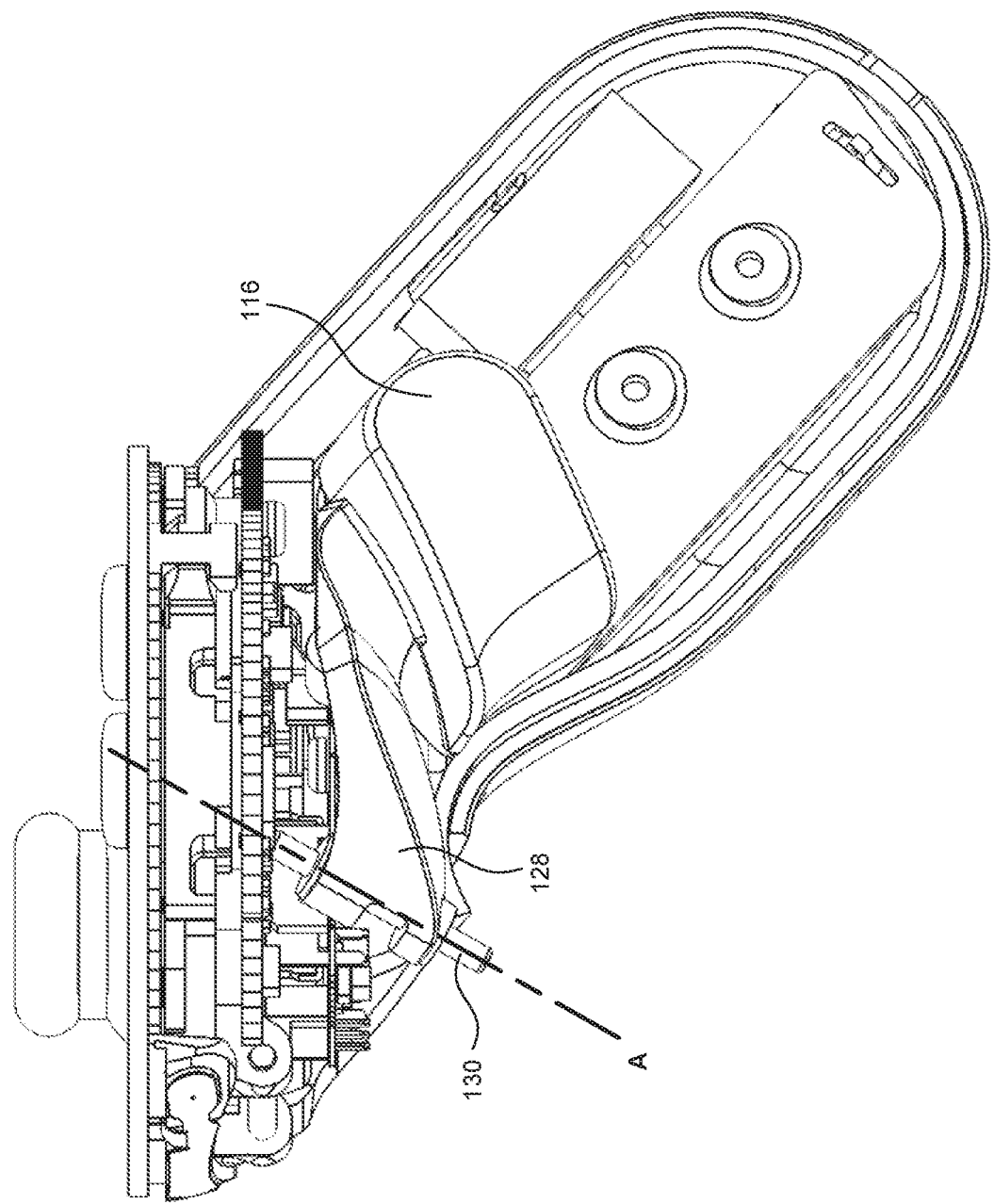
FIG. 4 is a side view and elevation with various components hidden to show a finger button mounting arrangement.
Figure 5:
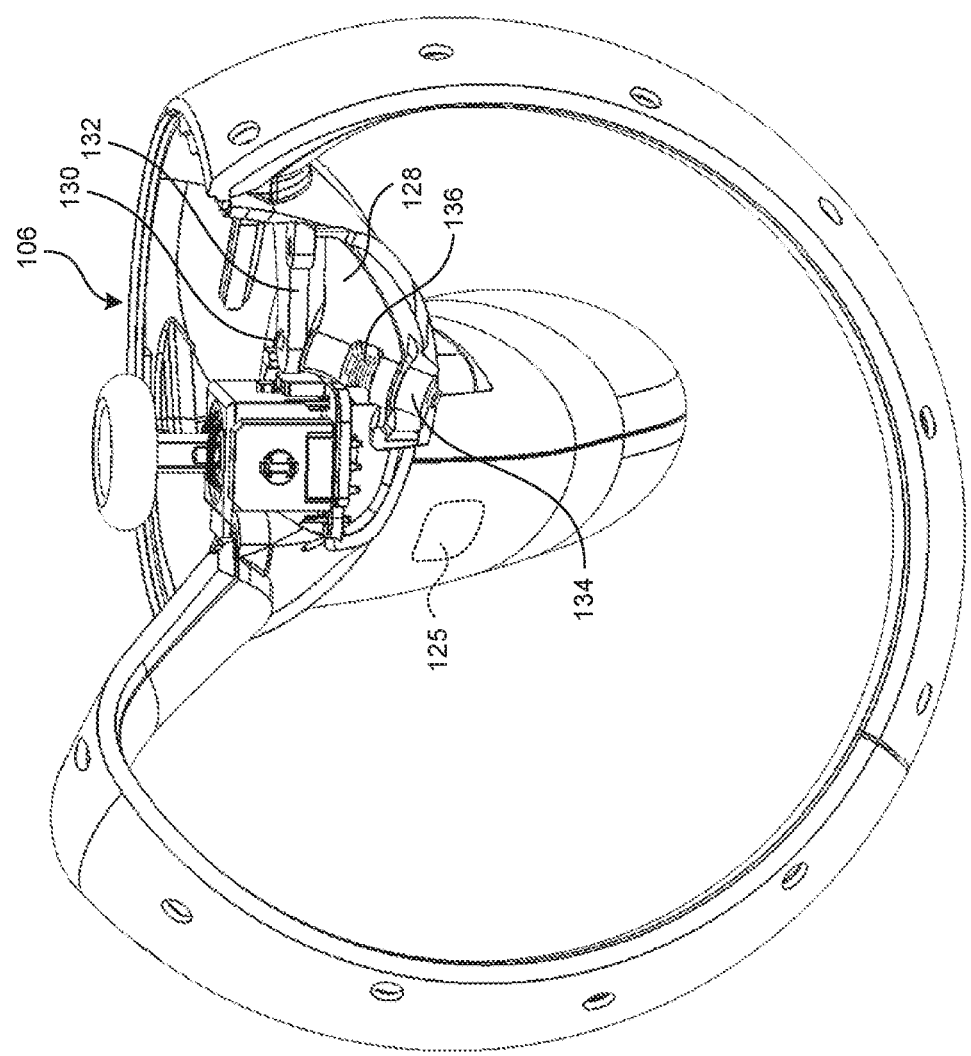
FIG. 5 is a front isometric view of the handheld controller with various components hidden to show a finger button mounting arrangement.

With reference to FIG. 3, the handle portion 108 includes a palm side 124, which confronts the palm of the user's hand 5, and a finger side 126 opposite the palm side 124 and generally confronts the fingers, such as the third-finger 11, of the user's hand 5. Accordingly, the third-finger button 116 is disposed on the finger side 126 of the handle portion 108. As shown in FIG. 4, the third-finger button 116 includes an arm 128 rotatably coupled to the main body 106 via a pivot shaft 130 extending along an axis A. With further reference to FIG. 5, the pivot shaft 130 is mounted at an angle with respect to the main body 106 in clevis arms 132 and 134 extending from the main body 106. In some embodiments, a torsion spring 136 is positioned about the pivot shaft 130 to return the arm 128 to the extended position and to provide tactile feedback to the user's third-finger 11 (see FIG. 2) in the form of a resistive force.

Figure 6:
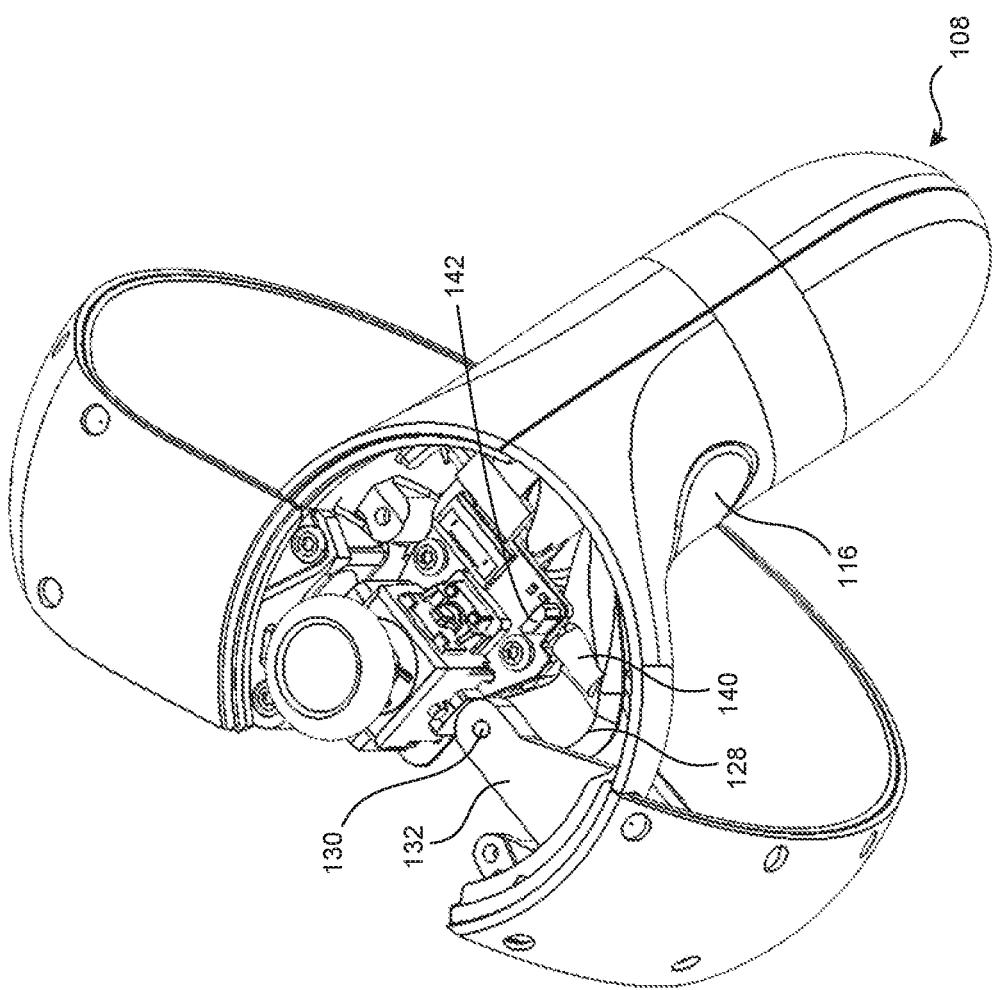
FIG. 6 is an isometric view of the handheld controller of FIG. 5 as viewed from above with various components hidden to show the finger button position sensor.

As shown in FIG. 6, the third-finger button 116 includes a detection feature, such as a magnet or other detectable member. In the illustrated embodiment, a magnet 140 is mounted on arm 128. A sensor 142 is positioned inside the handle adjacent the magnet 140. In some embodiments, the sensor 142 is a Hall effect sensor. A Hall effect sensor is a transducer that varies its output voltage in response to a magnetic field. Thus, as the magnet 140 moves closer to the sensor 142, the output voltage varies. Accordingly, the third-finger button 116 is an analog button in that it can detect various degrees of deflection corresponding to the force of a user's grip on the handle portion 108 and output a signal corresponding to movement of the third-finger button 116. In some embodiments, the magnet 140 and the Hall effect sensor 142 may be replaced by an on/off switch such as a miniature snap-action switch, for example. In some embodiments, movement of the third-finger button 116 can be detected with an inductive proximity sensor or other suitable type of proximity sensor. In some embodiments, the detection feature for use with a proximity sensor can be a location (e.g., target location) on the third-finger button 116.

Figure 7:
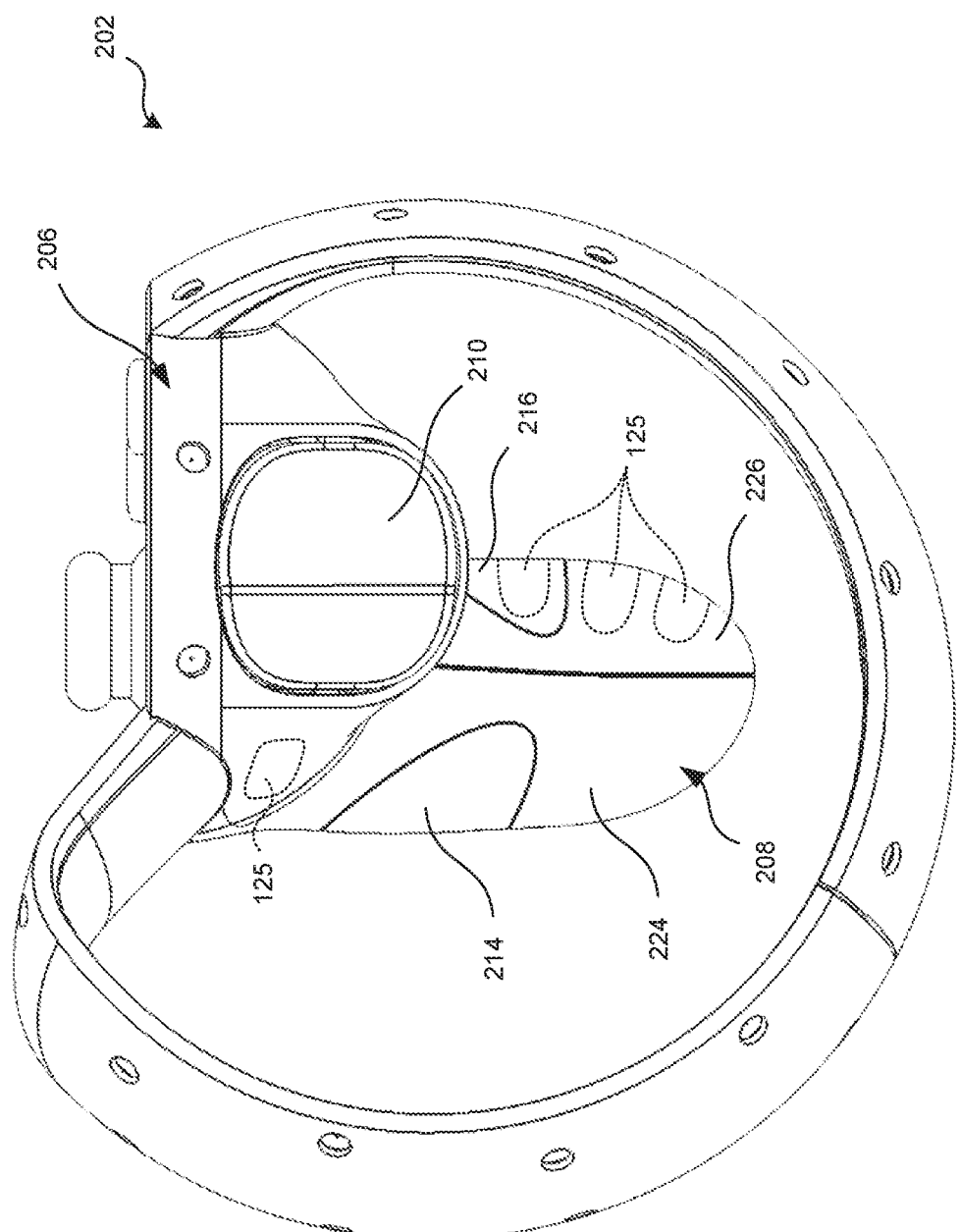
FIG. 7 is a front view in elevation of a handheld controller including hand detection sensors according to another representative embodiment.

FIG. 7 illustrates a handheld controller 202 according to a representative embodiment. The handheld controller 202 comprises a main body 206, a trigger button 210 positioned on the main body 206, and a handle portion 208 extending from the main body 206 on the side opposite the trigger button 210. The handle portion 208 has a palm side 224 and a finger side 226. A first pressure sensitive sheet or pad 214 is positioned on the palm side 224 of the handle portion 208 and a second pressure sensitive sheet or pad 216 is positioned on the finger side 226. The pressure sensitive pads 214/216 are operative to detect compression of the pads caused by a user's fingers and/or palm, thereby registering the presence and/or strength of a user's grip around the handle portion 208. In some embodiments, the handle portion 208 only includes one or other of the first and second pressure sensitive pads 214/216.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller configured to be held by a user's hand to interact with a virtual reality system, comprising:
   a main body;
   a surrounding ring portion that extends from a left side of the main body to form a ring by connecting back with a right side of the main body;
   a handle extending from the main body, wherein the handle has a palm side and a finger side; and
   a third-finger button on the finger side of the handle configured such that when the third-finger button is depressed, the virtual reality system registers that the user's hand is grasped around the handle;
   wherein:
   the virtual reality system is implemented in part through a virtual reality headset;
   the third-finger button comprises an arm rotatably coupled to the main body;
   the arm is rotatably coupled to the main body via a pivot shaft extending along an axis;
   the pivot shaft is mounted at an angle with respect to the main body in two separate clevis arms extending from the main body; and
   a torsion spring is positioned about the pivot shaft to return the arm to an extended position such that tactile feedback is provided to the user's third-finger in a resistive force.

2. The handheld controller of claim 1, wherein a presence of an open hand gesture triggers a signal to the virtual reality system to include the open hand gesture in a corresponding avatar.

3. The handheld controller of claim 1, wherein a palm sensor on the palm side functions as a pistol grip safety.

4. The handheld controller of claim 1, wherein a palm sensor on the palm side comprises a first pressure sensitive sheet and a second pressure sensitive sheet is positioned on the finger side.

5. The handheld controller of claim 4, wherein the first pressure sensitive sheet and the second pressure sensitive sheet together detect a strength of the user's grip around the handle.

6. The handheld controller of claim 1, wherein the handheld controller includes tracking patterns comprised of patterns of lights.

7. The handheld controller of claim 1, further comprising a first button positioned on a thumb surface of the main body adjacent a thumbstick.

8. The handheld controller of claim 6, wherein the virtual reality system is configured to monitor movement of the tracking patterns with a tracking camera.

9. The handheld controller of claim 1, further comprising a detection sensor on the main body.

10. The handheld controller of claim 1, wherein a palm sensor on the palm side comprises a first pressure sensitive sheet.

11. The handheld controller of claim 10, wherein the palm sensor on the palm side comprises a first pressure sensitive sheet and the handheld controller further comprises a second pressure sensitive sheet.

12. The handheld controller of claim 11, wherein the handheld controller further comprises a set of three detection sensors.

13. The handheld controller of claim 12, wherein the handheld controller further comprises a set of three detection sensors is disposed on the finger side.

14. The handheld controller of claim 13, wherein the second pressure sensitive sheet is disposed on the finger side and overlaps a first one of the three detection sensors.

15. The handheld controller of claim 14, wherein the third-finger button comprises the first one of the three detection sensors corresponding to a third finger of the user.

16. The handheld controller of claim 10, further comprising a first button positioned on a thumb surface of the main body adjacent a thumbstick.

17. The handheld controller of claim 16, further comprising a second button positioned on the thumb surface of the main body adjacent the thumbstick.

18. The handheld controller of claim 1, further comprising a first detection sensor on the finger side of the handle and positioned to detect the presence of a specific finger of the user relative to the handle.

19. The handheld controller of claim 18, wherein the first detection sensor comprises a proximity sensor.

20. The handheld controller of claim 1, wherein the handheld controller is configured such that when both the handheld controller detects that the third-finger button on the finger side is released and also a palm sensor on the palm side detects the user's hand, the virtual reality system in response indicates an open hand gesture.

* * * * *